Sept. 22, 1931.  P. P. QUAYLE  1,824,407
INTENSITY OF IGNITION APPARATUS
Filed Nov. 11, 1929
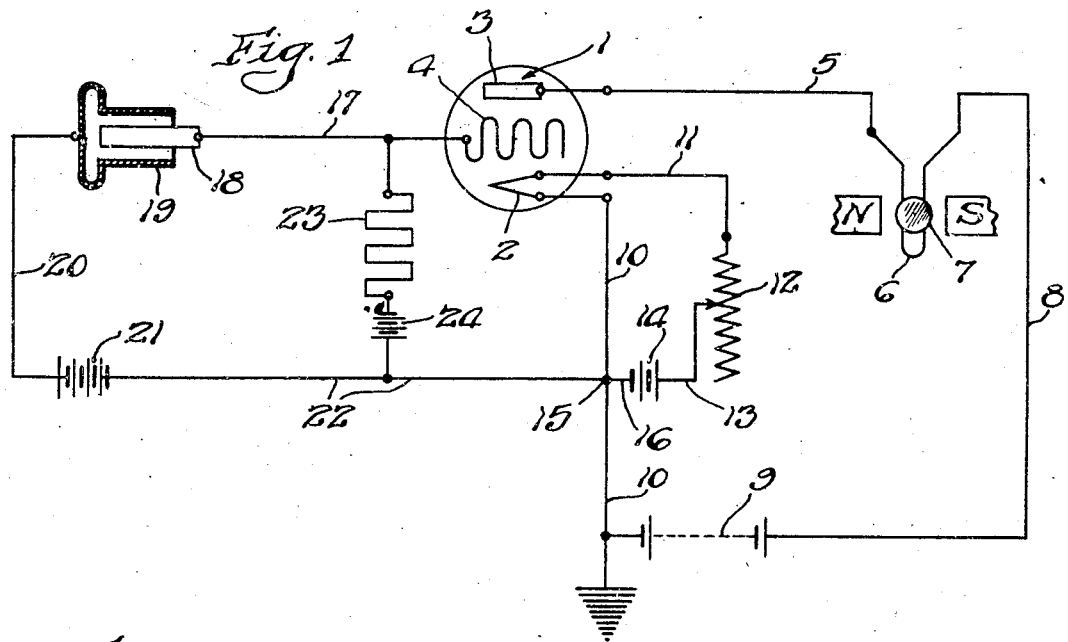
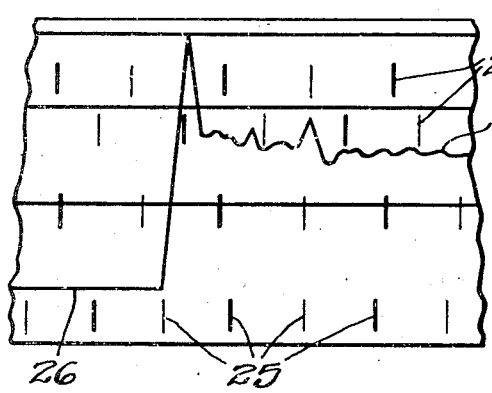
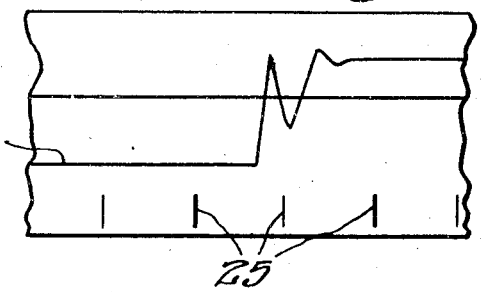
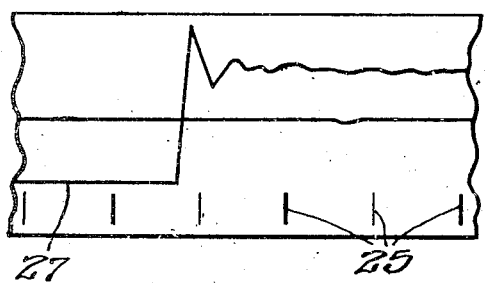
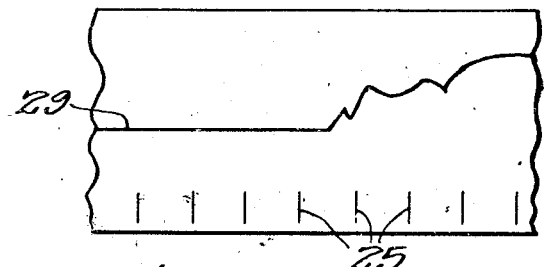
Inventor:
Philip P. Quayle,
By Chas. M. Nissen,
Att'y.

Patented Sept. 22, 1931

1,824,407

UNITED STATES PATENT OFFICE

PHILIP P. QUAYLE, OF LEBANON, OHIO, ASSIGNOR TO THE PETERS CARTRIDGE COMPANY, OF CINCINNATI, OHIO, A CORPORATION OF OHIO

INTENSITY OF IGNITION APPARATUS

Application filed November 11, 1929. Serial No. 406,450.

The present invention relates to instruments for testing explosives and has for one of its objects the provision of a means whereby the intensity of explosion of an explosive may be measured. More specifically, this apparatus contemplates testing the intensity of the explosion resulting from the firing of a primer used in an ordinary shell but it will be understood that with slight modification within the skill of an ordinary mechanic, the apparatus may be used to test other types of explosive and explosive members, such as dynamite caps and the like.

Another object of this invention is to determine the ability of any given primer to ignite the powder charge of the cartridge, and designating this ability of the primer as the "intensity of ignition" of said primer.

Another object of this invention is the provision of suitable instruments for measuring the intensity of the explosion. More specifically, this invention contemplates using an oscillograph for recording the intensity of the explosion and also the duration of the explosion and the elapsed time between the beginning of the explosion and the peak of the ignition. Any suitable means may be provided for moving a film in a predetermined path in front of the oscillograph to record the movements of the mirror in the oscillograph. It will be noted that other types of recording or registering instruments may be used to record the intensity of ignition, the oscillograph being used merely for the purposes of illustration.

Referring now to the drawings:—

Fig 1 is a diagrammatic view of the electrical circuit used in an apparatus constructed according to my invention;

Figs. 2, 3, 4 and 5 are reproductions of actual graphs obtained by the use of the apparatus disclosed, the graphs being recorded on suitable films.

In Fig. 1, the reference numeral 1 indicates a vacuum tube provided with the filament 2 and plate 3 in a well-known manner, and also a grid 4 interposed between the plate 3 and the filament 2. The plate is connected by means of the lead 5 to an oscillograph diagrammatically illustrated at 6, having a mirror 7 thereon for reflecting a beam of light onto a film or any other type of recording or registering apparatus desired. The operation of the oscillogaph is well known and no detailed description thereof is necessary since no novelty is being claimed in the oscillograph per se. However, I will give a brief description of the operation of the oscillograph as used in my invention.

The oscillograph 6 has an electrical conductor extending between the magnets N and S so that when a current is passed through the conductor, the reaction between the electrical field around the conductor and the magnets designated N and S will cause the mirror 7 of the oscillograph to rotate about an axis into various angular positions. A beam of light is projected onto the mirror and the mirror reflects the light onto the film which is moved in front of the mirror and past the same, so that the beam of light traces a graph on the sensitive side of the film. The film then can be developed in the usual manner and prints can be made of the graph, if desired. The speed with which the film is moved past the mirror can readily be determined or the film can be marked in such a manner as to correspond to the rate at which the same is moving past the mirror.

The oscillograph is also connected by means of the conductor 8 to the battery 9, and the battery 9 is connected by means of the conductor 10 to one lead of the filament 2 of the vacuum tube, the other lead of the filament 2 being connected by means of the conductor 11 to the variable resistance 12 which, in turn, is connected by means of the conductor 13 to the battery 14, the battery 14 being also connected to the conductor 10 at 15 by means of a suitable conductor 16.

With as much of the apparatus as has been so far described, the current would flow through the vacuum tube and the oscillograph would be moved into an angular position dependent upon the amount of current flowing through the vacuum tube. However, it is desired that substantially no current will flow through the vacuum tube until after the explosive being tested has been exploded. This is done in the following manner.

The grid 4 is given a slightly negative charge by means of the circuit which I will now describe. This circuit comprises the conductor 17 connected to the grid 4 and to an electrode 18 adapted to extend into the shell 19, which contains a primer (not shown), the electrode 18 being spaced from the inner walls of the shell. The shell 19 is of the rim fire type and is connected by means of the conductor 20 to a battery 21 which, in turn, is connected to the conductor 10 by a suitable conductor 22. A suitable non-inductive resistance 23 is connected across the conductors 17 and 22 so that the same is arranged in parallel with the electrode 18 and shell 19. A battery 24 is connected in series with the non-inductive resistance 23 in the manner illustrated in the diagram shown in Fig. 1. The resistance 23 is extremely high and no current is normally flowing between the shell 19 and the electrode 18. Due to the arrangement shown, the grid 4 normally has a slightly negative charge and prevents any flow of current from the filament 2 to the plate 3.

When the primer of the shell 19 is fired, the hot gases resulting from the explosion of the primer permit the electrons to flow from the electrode 18 to the shell 19 and thus leave the grid 4 positively charged. With the grid 4 positively charged, the electrons can flow from the filament 2 to the plate 3 and the oscillograph 6 is moved through an angle dependent upon the amount of current flowing between the filament 2 and the plate 3. It has been found from hundreds of records, such as those shown in Figs. 2, 3, 4 and 5, that the more effective a given primer is, the greater the magnitude of the current through the oscillograph, and, consequently, the greater the magnitude of swing given to said oscillograph, the movements of which are recorded on the moving film.

The operation of the device is as follows:—
The shell 19 containing the primer is positioned so that the electrode 18 is arranged therein and the shell is struck so that the primer is ignited, thus causing the grid 4 to become positively charged and thus permitting the current to flow from the filament 2 to the plate 3 as previously described, the current passing through the oscillograph 6, the mirror of which reflects the beam of light onto the sensitized film in a well-known manner.

The effect of various primers is shown in the graphs illustrated in Figs. 2, 3, 4 and 5. The markings 25 on each of these graphs represent time intervals or, in other words, represent the time a given section of the film takes to move past the oscillograph so that the time required for complete ignition of the explosive charge can be determined and other valuable data obtained from the graphs recorded on the films.

In Fig. 2, the graph 26 represents diagrammatically the action of what is known as a 621 primer. The graph 27 in Fig. 3 represents the action of a D-55 primer. The graphs 28 and 29 in Figs. 4 and 5 represent the actions of a typical double ignition primer and a typical hang-fire primer. It has been found that the average rim fire priming mixture lasts approximately from 2 to 3 ten-thousandths of a second.

It will be understood that while I have illustrated a rim fire shell at 19, the device is equally applicable to shells equipped with center fire primers, and dynamite caps may be tested in the same way by using a suitably constructed bomb in which the gases formed, after the ignition of the dynamite cap, complete the electrical circuit in a manner similar to the manner in which the gases in the shell 19 complete the circuit between 19 and 18.

In the operative embodiment of the invention, a non-inductive resistance of 2,000,000 ohms was used at 23, a total resistance of 6 ohms was used in the resistance 12, and voltages of 17, 12, 6 and 200 were used for the batteries 21, 24, 14 and 9, respectively. However these values are given merely for the purposes of illustration and I do not desire to limit myself to a device using resistances and voltages as specified as it is obvious that other resistances and voltages could be used to give the desired results.

Obviously, those skilled in the art may make various changes in the details and arrangement of parts without departing from the spirit and scope of the invention as defined by the claims hereto appended, and I therefore do not wish to be restricted to the precise construction herein disclosed.

Having thus fully disclosed an embodiment of my invention, what I claim and desire to secure by Letters Patent of the United States is:—

1. An electrical apparatus comprising a vacuum tube having a plate, a filament, and a grid therein, an electrical circuit in which said vacuum tube is included, a source of electrical energy for said circuit, an indicating instrument in said electrical circuit, electrical means normally preventing flow of current through said vacuum tube, and means operable on the explosion of an explosive being tested to render said electrical means inoperative for the purpose set forth.

2. An electrical apparatus comprising a vacuum tube having a plate, a filament, and a grid therein, an electrical circuit in which said vacuum tube is included, a source of electrical energy for said circuit, an oscillograph in said electrical circuit, means normally preventing the flow of current through said vacuum tube, and means operable on the explosion of an explosive being tested to render said electrical means inoperative for the purpose set forth.

3. An electrical apparatus comprising a vacuum tube having a plate, a filament, and a grid, an electrical circuit having leads therein connected to the filament and plates respectively, an indicating instrument in said circuit, means for normally preventing flow of current from said filament to said plate comprising a second circuit connected to said grid, and means in said second circuit for so changing the character of the grid as to permit current to flow from said filament to said plate when an explosive being tested is exploded, said indicating instrument indicating a function of said explosion.

4. An electrical apparatus comprising a vacuum tube having a plate, a filament, and a grid therein, an electrical circuit having leads thereof connected to said plate and filament respectively, a source of electrical energy for said circuit, an indicating means in said circuit, a second circuit connected to said grid for maintaining a negative charge thereon, and means for changing the charge on said grid when an explosive connected in said second circuit is exploded.

5. Apparatus of the type described comprising an uncompleted electrical circuit including an indicating instrument, a source of electrical energy for said circuit, an air gap in said circuit, a primer in said circuit on one side of said air gap adapted to be exploded while in said circuit, the explosion of said primer causing the current to flow across said air gap to thereby actuate said indicating instrument.

6. An electrical apparatus comprising a vacuum tube having a plate, a filament, and a grid, an electrical circuit in which the vacuum tube is included, a source of electrical energy for said circuit, a second source of electrical energy for said filament adapted to pass through a variable resistance, means normally preventing the passage of current through said tube, and means for rendering said last-mentioned means inoperative when a primer to be tested is exploded.

7. An electrical apparatus comprising a vacuum tube having a plate, a filament, and a grid, an electrical circuit in which the vacuum tube is included, a source of electrical energy for said circuit, a second source of electrical energy for said filament adapted to pass through a variable resistance, means normally preventing the passage of current through said tube comprising a third circuit connected to said grid, said third circuit having a source of electrical energy, an air gap in said third circuit, a conductor on one side of said air gap adapted to be connected to a primer, said third circuit changing the charge on said grid when said primer is ignited.

8. A device as set forth in claim 7 in which the third circuit has a resistance connected in parallel to said air gap, and a source of electrical energy in series with said resistance.

9. An electrical apparatus comprising a vacuum tube having a plate, a filament, and a grid, an electrical circuit in which the vacuum tube is included, a source of electrical energy for said circuit, a second source of electrical energy for said filament, means normally preventing the passage of current through said tube comprising a third circuit connected to said grid, said third circuit having a source of electrical energy, an air gap in said third circuit, a conductor on one side of said air gap adapted to be connected to a primer, said third circuit changing the charge on said grid when said primer is ignited.

10. A device as set forth in claim 9 in which the third circuit has a resistance connected in parallel to said air gap, and a source of electrical energy in series with said resistance.

11. A device as set forth in claim 7 in which the third circuit has an extremely high resistance connected in parallel to said air gap, and a source of electrical energy in series with said resistance.

12. An electrical apparatus for testing primers comprising an electrical circuit having a source of electrical energy therein, a vacuum tube in said circuit, an indicating instrument in said circuit, a second electrical circuit normally incomplete, comprising a second source of electrical energy having a lead to said vacuum tube from one side thereof, a primer and an electrode spaced apart and connected by leads to said vacuum tube and to the other side of said second source of electrical energy, and means in said second circuit to prevent flow of current through said tube, said last mentioned means being rendered inoperative by the explosion of said primer in said second circuit, said explosion causing said second circuit to be completed.

13. An electrical apparatus for testing primers comprising an electrical circuit having a source of electrical energy therein, a vacuum tube in said circuit, an indicating instrument in said circuit, a second electrical circuit normally incomplete, comprising a second source of electrical energy having a lead to said vacuum tube from one side thereof, a primer and an electrode spaced apart and connected by leads to said vacuum tube and to the other side of said second source of electrical energy, and means connected to said vacuum tube for normally preventing passage of a current through said tube, said last mentioned means being rendered inoperative when said primer is exploded.

14. An electrical apparatus for testing primers comprising an electrical circuit having a source of electrical energy therein, a vacuum tube in said circuit, an indicating instrument in said circuit, a second electrical circuit normally incomplete, comprising a second source of electrical energy having a lead to said vacuum tube from one side thereof, a primer and an electrode spaced apart and connected by leads to said vacuum tube and to the other side of said second source of electrical energy, and grid biasing means in said second circuit, for biasing the grid in said vacuum tube for normally preventing the flow of current in said first circuit, said grid biasing means being rendered inoperative when said primer is exploded to permit the flow of electrical energy through said vacuum tube to thereby actuate said indicating instrument.

15. An electrical apparatus for testing primers comprising an electrical circuit having a source of electrical energy therein, a vacuum tube in said circuit, an indicating instrument in said circuit, a second electrical circuit normally incomplete, comprising a second source of electrical energy having a lead to said vacuum tube from one side thereof, a primer and an electrode spaced apart and connected by leads to said vacuum tube and to the other side of said second source of electrical energy, and a grid biasing means operatively connected to said vacuum tube for normally preventing the flow of electrical energy through said tube, said biasing means including a source of electrical energy and a non-inductive resistance arrangement in series with each other and with said vacuum tube, said grid biasing means being rendered inoperative when said primer is exploded and the gases from the explosion complete said second electrical circuit by permitting electrical energy to flow across the space between said electrode and said primer.

16. A device as claimed in claim 15 in which said indicating instrument is an oscillograph.

17. An apparatus of the type disclosed comprising an incomplete electrical circuit including an indicating instrument, a source of electrical energy for said circuit, a second electrical circuit having means therein for making said first circuit complete, and also having an air gap therein for normally rendering said means inoperative, and thereby preventing the flow of current in said first circuit, and electrical conductors on opposite sides of said air gap one of said conductors being adapted to be attached to an explosive member, said explosive member being so arranged in said second circuit as to cause current to pass through said air gap in proportion to the intensity of the explosion produced when said explosive member is exploded.

18. A primer testing apparatus comprising an electrical circuit in which are included an indicating instrument and a source of electrical energy, a primer to be exploded, means for normally preventing flow of current in said electrical circuit to thereby prevent the actuation of said instrument, and means responsive to the explosion of said primer to cause a flow of energy through said electrical circuit and said instrument in proportion to the intensity of the explosion.

19. A primer testing apparatus comprising an electrical circuit in which are included an indicating instrument and a source of electrical energy, a primer to be exploded, means for normally preventing flow of current in said electrical circuit to thereby prevent the actuation of said instrument, and means responsive to the explosion of said primer to cause a flow of current through said electrical circuit at a rate proportional to the rate of explosion of said primer.

20. An apparatus of the type disclosed comprising an incomplete electrical circuit including an indicating instrument, a source of electrical energy for said circuit, a second electrical circuit having means therein for making said first circuit complete, and also having an air gap therein for normally rendering said means inoperative, and thereby preventing the flow of current in said first circuit, and electrical conductors on opposite sides of said air gap, one of said conductors being adapted to be attached to an explosive member, said explosive member being so arranged in said second circuit as to cause current to pass through said air gap in proportion to the rate of the explosion produced when said explosive member is exploded.

21. In an intensity of ignition apparatus the combination with an electrical circuit including an indicating instrument, and a source of electrical energy, of a vacuum tube in said circuit comprising a plate, a filament, and a grid arranged between said plate and filament, means for biasing said grid to prevent flow of current through said electrical circuit and thereby prevent electrical flow through said indicating instrument, and a primer connected to said grid biasing means constructed and arranged to render said grid biasing means inoperative when said primer is exploded.

22. In an intensity of ignition apparatus the combination with an electrical circuit including an indicating instrument, and a source of electrical energy, of a vacuum tube in said circuit comprising a plate, a filament, and a grid arranged between said plate and filament, means for biasing said grid to prevent flow of current through said indicating instrument, and a primer connected to said grid biasing means constructed and arranged to render said grid biasing means inoperative when said primer is exploded.

In testimony whereof I have signed my name to this specification on this 6 day of November, A. D. 1929.

PHILIP P. QUAYLE.